United States Patent [19]

Leigh-Monstevens et al.

[11] Patent Number: 4,993,529

[45] Date of Patent: * Feb. 19, 1991

[54] CONCENTRICALLY MOUNTED HYDRAULIC CLUTCH ACTUATOR

[75] Inventors: Keith V. Leigh-Monstevens, Troy; David L. Wrobleski, Fraser; Paul M. Regula, Sterling Heights, all of Mich.

[73] Assignee: Automotive Products plc, Warwickshire, England

[*] Notice: The portion of the term of this patent subsequent to Apr. 10, 2007 has been disclaimed.

[21] Appl. No.: 207,653

[22] Filed: Jun. 15, 1988

Related U.S. Application Data

[63] Continuation-in-part of Ser. No. 153,512, Feb. 18, 1988, which is a continuation of Ser. No. 921,762, Oct. 22, 1986, abandoned.

[51] Int. Cl.$^5$ ............... F16D 25/08; F16D 23/14
[52] U.S. Cl. ................ 192/85 CA; 192/91 A; 192/98; 92/107
[58] Field of Search ............ 192/85 CA, 91 A, 98, 192/110 B; 92/107

[56] References Cited

U.S. PATENT DOCUMENTS

| | | | |
|---|---|---|---|
| 2,089,472 | 8/1937 | Geyer | 192/70.17 |
| 2,345,860 | 4/1944 | Scott-Iversen | 192/85 CA |
| 2,388,857 | 11/1945 | Lindsley | 192/85 CA |
| 2,550,373 | 4/1951 | Ortloff et al. | 192/86 |
| 2,717,680 | 9/1955 | Smith | 192/91 A |
| 3,004,438 | 10/1961 | Funk et al. | 192/85 CA X |
| 3,045,790 | 7/1962 | Becker | 192/38 |
| 3,474,888 | 10/1969 | Carlson et al. | 192/113 B |
| 3,955,660 | 5/1976 | Poon et al. | 192/91 A |
| 4,366,890 | 1/1983 | Suckow | 192/0.096 |
| 4,609,087 | 9/1986 | Shirley | 192/85 CA |
| 4,620,625 | 11/1986 | Ladin | 192/85 CA |
| 4,660,694 | 4/1987 | Nix et al. | 192/85 CA |
| 4,869,355 | 9/1989 | Corral et al. | 192/98 |

FOREIGN PATENT DOCUMENTS

| | | |
|---|---|---|
| 2923487 | 11/1980 | Fed. Rep. of Germany . |
| 2194263 | 2/1974 | France . |
| 2395429 | 1/1979 | France . |
| 1168926 | 10/1969 | United Kingdom . |
| 1323794 | 7/1973 | United Kingdom . |
| 1550860 | 8/1979 | United Kingdom . |
| 2046864 | 11/1980 | United Kingdom . |
| 2088010 | 6/1982 | United Kingdom . |
| 2116283 | 9/1983 | United Kingdom . |
| 2174169 | 10/1986 | United Kingdom . |

*Primary Examiner*—Richard Lorence
*Attorney, Agent, or Firm*—Krass & Young

[57] ABSTRACT

The hydraulic clutch actuator for a motor vehicle of the concentric type in which the actuator is mounted concentrically around the transmission input shaft of the vehicle within the housing of the clutch. The actuator includes a housing structure defining a central quill shaft surrounding the input shaft of the vehicle and slidably supporting the hub portion of the bearing carrier and further defines an annular piston bore spaced radially outwardly from the quill shaft to define an annular bore between the piston bore and the quill shaft into which the rear end of the hub portion of the bearing carrier may move during the operation of the actuator so as to provide overlap as between the annular piston and the bearing carrier and minimize the axial dimension of the actuator. The preload spring is also positioned in the annular bore between the quill shaft and the piston bore so as to further optimize the compact packaging of the actuator.

14 Claims, 2 Drawing Sheets

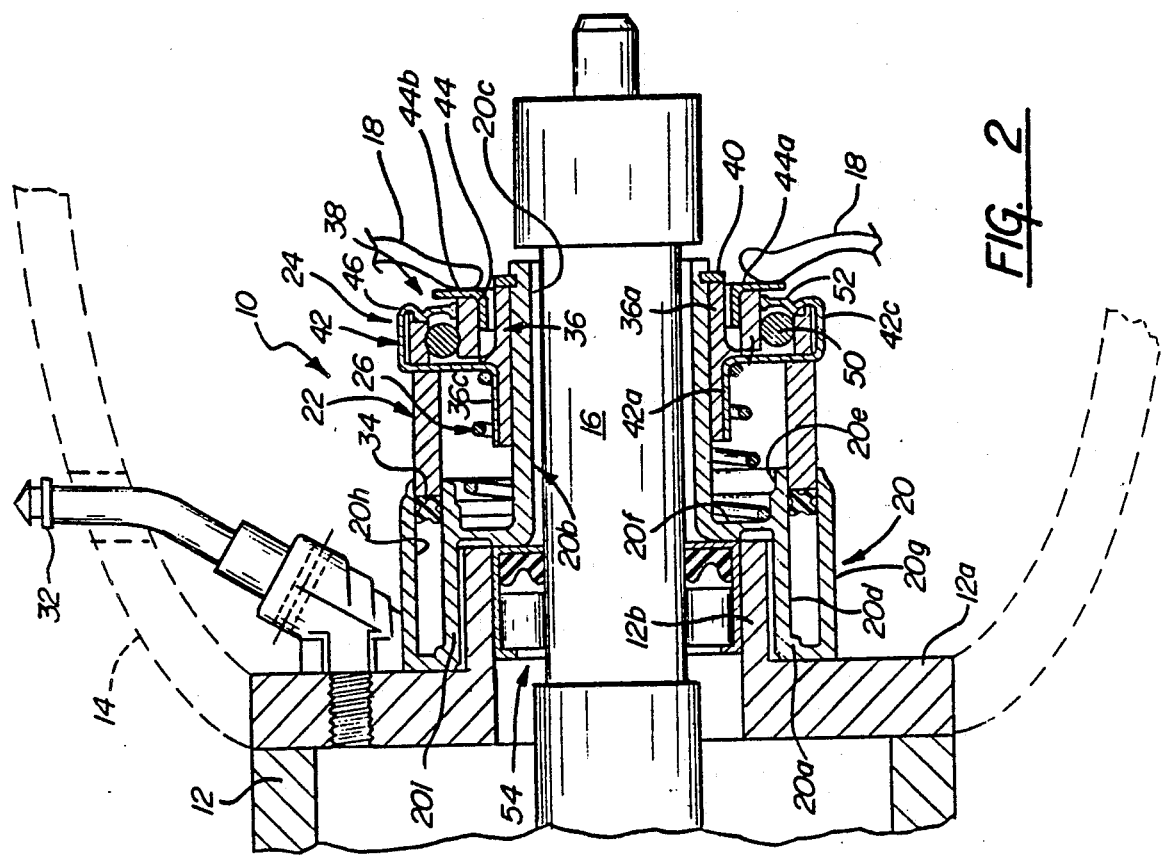

CONCENTRICALLY MOUNTED HYDRAULIC CLUTCH ACTUATOR

REFERENCE TO RELATED APPLICATION

This application is a continuation-in-part of U.S. patent application, Ser. No. 153,512 filed on Feb. 18, 1988 which is a continuation of U.S. patent application, Ser. No. 921,762 filed on Oct. 22, 1986 now abandoned.

FIELD OF THE INVENTION

This invention relates to hydraulic clutch actuators for use with motor vehicles having manual transmissions. More specifically, this application relates to a hydraulic clutch actuator in the form of a concentric slave cylinder which is intended for mounting within the clutch housing in concentric surrounding relation to the transmission input shaft interconnecting the clutch and the transmission of the vehicle.

BACKGROUND OF THE INVENTION

The clutch actuator for manual transmission motor vehicles comprises a selectively displaceable element which is connected to the release member of the clutch assembly to separate two rotatable elements of the clutch, which elements are normally frictionally coupled to transfer energy from the engine crank shaft to the transmission input shaft. In the case of a hydraulic actuator the actuator comprises the slave portion of a hydraulic master cylinder/slave cylinder assembly wherein the master cylinder is mounted to be directly operated by the clutch pedal.

As is well known, the release element of the clutch rotates at engine speed when the clutch is engaged and slows down and may eventually stop when the clutch is released or disengaged to permit a gear change. The actuator, on the other hand, is non-rotating, that is the body of the actuator must be secured against rotation to a structural component such as the transmission housing of the clutch housing. Therefore, the clutch actuator must be connected to the release member through a bearing, commonly called a throw-out or release bearing.

The actuator can be an external slave unit mounted off axis relative to the transmission input shaft or it can be a concentric slave cylinder mounted concentrically with respect to the transmission input shaft. The off axis arrangement involves a lever arm connected between the actuator output element and the clutch release member. The typical concentric arrangement requires no such lever arm. Instead, the cylinder body of the actuator is fixed to the clutch bell housing or to the face of the transmission housing and the axially translatable piston is connected to the outer race of the throw-out bearing. The inner race is in turn connected to the clutch release element.

Examples of concentric clutch actuators are shown for example in U.S. Pat. Nos. 4,585,106 or 4 585,107; 4,585,108; 4,585,109; 4,609,087; 4,624,290; 4,660,694; 4,684,003; 4,687,084 and 4,708,228, all assigned to the assignee of the present application.

Whereas the concentric slave cylinders disclosed in the above-identified U.S. patents are generally satisfactory, there are certain applications in which the actuator profile or overall size presents installation and/or operational problems.

SUMMARY OF THE INVENTION

This invention is directed to the provision of an improved concentric slave cylinder for use with a clutch of a manual transmission motor vehicle.

More specifically, this invention is directed to the provision of a concentric slave cylinder for a manual clutch which provides an extremely compact actuator package.

The invention hydraulic actuator is intended for use with a clutch of the type including a transmission input shaft for connection to a transmission and having an axis of rotation, and a clutch release element which is displaceable along the rotational axis of the transmission input shaft.

According to the invention, the hydraulic actuator includes a housing structure adapted to be positioned within the clutch housing concentrically around the transmission input shaft and defining a rearward mounting section, a quill shaft extending forwardly from the rearward mounting section in concentric surrounding relation to the transmission input shaft, and an annular piston bore having an open forward end and having an inner diameter greater than the outer diameter of the quill shaft by a predetermined radial distance; an annular piston having its rear end positioned in the piston bore and extending at its forward end out of the piston bore; and a bearing assembly including a bearing carrier having a hub portion slidably mounted on the quill shaft and having a radial thickness less than the predetermined radial distance between the inner diameter of the piston bore and the outer diameter of the quill shaft. This arrangement allows the hub portion of the bearing carrier to assume an axially overlapping relation to the annular piston during the operation of the actuator and thereby provides a minimal axial dimension for the actuator.

According to a further feature of the invention, the housing structure of the actuator is rearwardly undercut between the quill shaft and the piston bore to define an annular bore. This arrangement allows the hub portion of the bearing carrier to move slidably at its rearward end into the annular bore between the quill shaft and the piston bore during the operation of the actuator so as to further minimize the axial dimension of the actuator.

According to a further feature of the invention, the bearing assembly includes an annular bearing housing extending radially outwardly from the hub portion in forwardly spaced relation to the rear end of the hub portion and the forward end of the piston is drivingly connected to the annular bearing housing. This arrangement facilitates the overlapping movement of the hub portion of the bearing carrier with respect to the annular piston.

According to a further feature of the invention, the actuator further includes a coil spring surrounding the quill shaft and positioned radially between the annular piston and the bearing carrier hub portion. This arrangement provides a convenient and protected location for the preload spring for the bearing and further contributes to the compact and efficient packaging of the various components of the hydraulic actuator.

In one disclosed embodiment of the invention, the hub portion of the bearing carrier, the bearing housing, and the annular piston are formed as a single integral piece, and in another disclosed embodiment the annular piston is formed as a separate piece from the bearing carrier and bears at its forward end against the rear face of the bearing housing.

BRIEF DESCRIPTION OF THE DRAWINGS

FIG. 1 is an end view of a hydraulic actuator according to the invention;

FIG. 2 is a cross sectional view taken on line 2—2 of FIG. 1;

FIG. 3 is a schematic view of a prefilled assembly including actuator;

DETAILED DESCRIPTION OF THE PREFERRED EMBODIMENT

Figure 4:
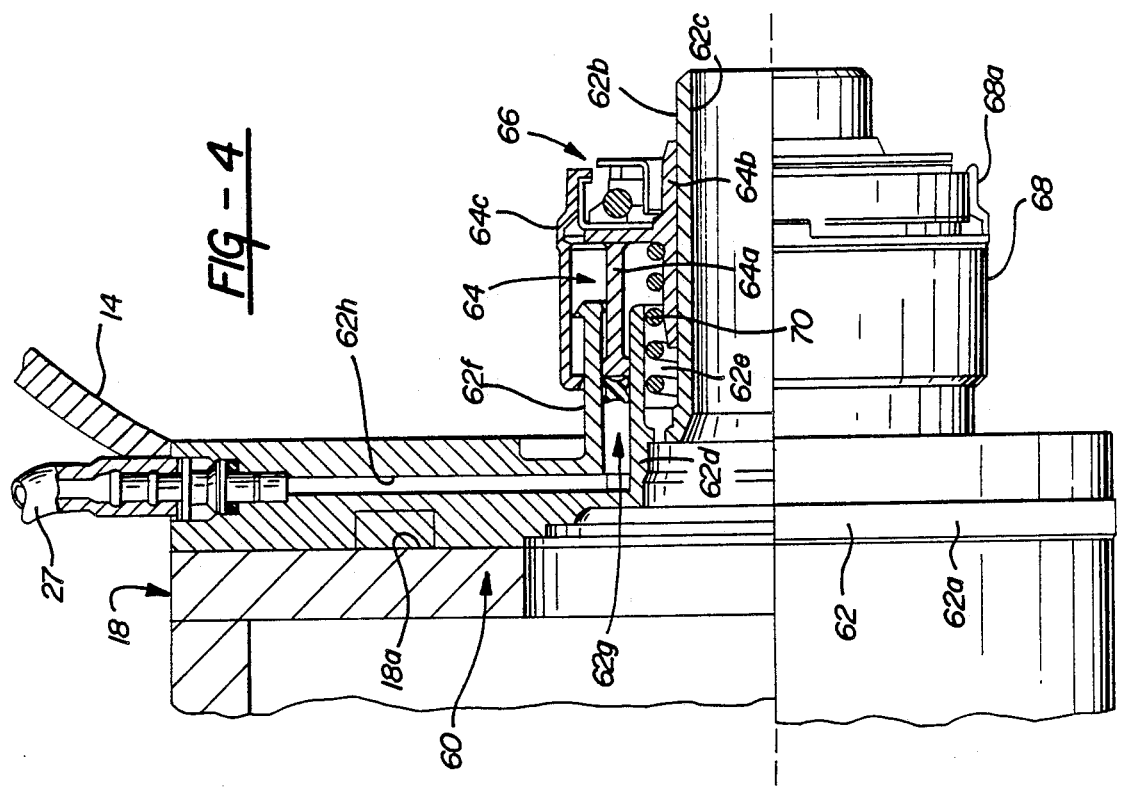
FIG. 4 is a view of a modified form of the invention hydraulic actuator.

The invention hydraulic actuator 10 seen in FIGS. 1 and 2 is intended for use with a motor vehicle of the type including a transmission housing 12, a clutch bell housing 14, a transmission input shaft 16 drivingly interconnecting the vehicle clutch and the vehicle transmission, and a plurality of diaphragm spring fingers 18 acting in known manner to engage and disengage the clutch in response to operation of hydraulic actuator 10.

Actuator 10 is positioned within clutch bell housing 14 in concentric surrounding to input shaft 16 and is secured to transmission housing 12.

Actuator 10 includes a housing 20, an annular piston 22, a bearing assembly 24, and a preload spring 26.

Housing 20 may be formed for example of a suitable plastic material and includes a rearward mounting section 20a adapted to be positioned against the front face 12a of transmission housing 12, a central annular forwardly extending quill shaft section 20b defining an inner bore 20c extending centrally through the housing and sized to loosely pass input shaft 16, and a piston section including an annular inner piston wall section 20d and an annular outer piston wall section 20g. Annular inner piston wall section 20d extends forwardly from mounting section 20a in concentric, radially outwardly spaced relation to quill shaft 20b to define an annular intermediate bore 20e therebetween open at its forward end and closed at its rearward end by an annular shoulder 20f interconnecting piston wall section 20d and the rear end of quill shaft section 20b, and annular outer piston wall section 20g extends forwardly from mounting section 20a in concentric, radially outwardly spaced relation to inner piston wall section 20d to define an annular, outer piston bore 20h therebetween closed at its rearward end by mounting section 20a and open at its forward end. Housing 20 is mounted on the front face 12a of transmission housing 12 by piloting the counterbore 20i defined by shoulder 20f and inner piston wall section 20d over an annular central hub portion 12b extending forwardly from the front face of the transmission housing.

Housing 20 further includes integrally formed fittings 20j and 20k connected in known manner to conduits 27 and 28 connected respectively to the discharge fitting of the associated master cylinder 29 and to a suitable vent device 30. Conduits 27 and 28 respectively communicate via fittings 20j and 20k with the rear end of piston bore 20h via passages 20l and 20m defined respectively by fittings 20j and 20k. An eyelet 20n positioned between fittings 20j and 20k and formed integrally with the fittings provides a central aperture 20p for passage of a suitable threaded fastener (not shown) for engagement with a threaded bore in the front face of the transmission housing 12 to positively fasten housing 20 to the front face of the transmission housing.

Piston 22 is formed of a suitable plastic material and has an annular configuration sized to be slidably received within piston bore 20h. Specifically, annular piston 22 is received at its rear end in piston bore 20h and projects at its forward end out of the piston bore, and an annular seal 34 is positioned in bore 20g adjacent the rear end of piston 22 to preclude hydraulic fluid leakage. Piston 22 is seen in FIG. 2 in its extreme extended position corresponding to disengagement of the clutch.

Bearing assembly 24 includes a bearing carrier 36 and a bearing 38. Bearing carrier 36 is formed of a suitable plastic material and includes a hub portion 36a slidably received on the outer periphery of quill housing portion 20b and slidable in known manner axially along quill section 20b in response to operation of the actuator Hub portion 36a is precluded from rotation relative to quill shaft section 20b by internal axially extending ribs 36b guiding in external axially extending grooves 20q in quill shaft section 20b. The bearing carrier is seen in FIG. 2 in its extreme extended position corresponding to disengagement of the clutch with the extreme forward position defined and delimited by a snap ring 40 carried at the free forward end of quill shaft section 20b. For purposes of design stability, hub portion 36a preferably has an axial length at least equal to the outer diameter of quill shaft section 20b.

Bearing 38 includes a rearward housing member 42, a forward housing member 44, an outer race 46, an inner race 48, a plurality of ball bearings 50, and a seal 52.

Rear bearing housing 42 has a generally S configuration in cross section and includes an inner hub portion 42a fitted onto the outer periphery of the rear portion of bearing carrier hub portion 36a and an annular flange portion 42b, extending radially outwardly from hub portion 42a at a location intermediate the ends of carrier hub portion 36a, and an outer axially forwardly extending flange portion 42c.

Forward housing 44 includes a hub portion 44a positioned in concentrically spaced relation around bearing carrier hub portion 36a and a radially outwardly extending flange portion 44b bearing in known manner against diaphragm spring fingers 18. Outer race 46 is fixedly secured to housing 42 and is non-rotatable and inner race 48 is fixedly secured to housing 44 and is rotatable in known manner during engagement of the clutch. Seal 52 functions to preclude the entry of contaminants into the bearing.

Spring 26 is formed of steel and has a conical, coil configuration. The rear end of spring 26 is positioned in annular bore 20e and the front end of spring 26 bears against the rear face of radial flange portion 42b of bearing housing 42 so as to function to constantly preload the bearing and maintain the bearing assembly in a condition such that the flange portion 44b of the front bearing housing 44 is constantly and resiliently pressed against spring diaphragm fingers 18. The distance between the inner diameter of piston bore 20h and the outer diameter of quill shaft section 20b is substantially greater than the radial thickness of bearing carrier hub portion 36a so that piston 22 and bearing carrier hub portion 36a may be disposed in axially overlapping relationship so as to contribute to the the axial compactness of the actuator. Further, in the engaged position of the clutch the rear portion 36c of the bearing carrier hub portion 36a may retract into the undercut annular bore 20e so as to further facilitate the axial compactness of the invention actuator. The distance between the outer diameter of quill shaft section 20b and the inner diameter of piston bore 20h is also sufficient to allow spring 26 to be positioned between the bearing carrier hub portion and the piston 22 so as to provide a convenient and protected environment for the spring and so as to enable the spring to act against the rear face of the bearing assembly to conveniently and efficiently provide a preload for the bearing assembly.

A roller bearing and seal assembly 54 is positioned within transmission housing hub portion 12b so as to provide sealing and bearing support for shaft 16 in known manner.

Master cylinder 29, conduit 27 and actuator 10 are prefilled with hydraulic fluid and delivered to the motor vehicle manufacturer as a prefilled assembly for installation on the motor vehicle during the vehicle assembly process.

In the operation of the hydraulic actuator of FIGS. 1 and 2, hydraulic fluid is delivered through line 27 in known manner from the associated master cylinder 29 in response to depression of the associated clutch pedal 52 of the motor vehicle to move annular piston 22 axially relative to the housing of the actuator. The piston is seen in FIG. 2 in its extreme extended position corresponding to disengagement of the clutch. In the clutch engaged disposition of actuator 10, piston 22 is retracted rewardly within piston bore 20h and the rear portion 36c of bearing carrier hub portion 36a is positioned within the undercut bore 20e provided between piston bore 20h and quill shaft section 20b so as to facilitate the axially nested relationship of the bearing carrier and the piston and enable the provision of a hydraulic actuator having a relatively short axial dimension for installation applications in which the axial dimension is critical.

The modified hydraulic actuator 60 seen in FIG. 4 includes a housing 62 formed for example of a suitable plastic material. Housing 62 includes a rearward mounting section 62a adapted to be suitably positioned and mounted to the front face 18a of the transmission housing 18, a central annular quill shaft section 62b extending forwardly from mounting section 62a and defining an inner bore 62c sized to loosely pass the transmission input shaft; an annular inner piston wall section 62d extending forwardly from mounting section 60a in concentric, radially outwardly spaced relation to quill shaft section 62b to define an annular intermediate bore 62e therebetween closed at its rearward end by mounting section 62a and open at its forward end; and an annular outer piston wall section 62f extending forwardly from mounting section 60a in concentric, radially outwardly spaced relation to inner piston wall section 62d to define an annular outer piston bore 62g therebetween closed at its rearward end by mounting section 60a and open at its forward end. A radially outwardly extending passage 62h in housing mounting section 62a provides hydraulic fluid communication between conduit 27 from the associated master cylinder and piston bore 62g in known manner.

In the embodiment of FIG. 4, the annular piston of the actuator, the bearing carrier hub portion of the actuator, and a radial flange portion of the bearing carrier are all formed as a single integral member 64, formed preferably of plastic. Member 64 includes an annular piston portion 64a received at its rearward end in piston bore 62g and projecting at its forward end out of bore 62g; a bearing carrier hub portion 64b mounted slidably and non-rotatably on housing quill shaft section 62b and a radial flange portion 64c extending radially outwardly from bearing carrier hub portion 64b at a point spaced forwardly from the rear edge of the bearing carrier hub portion and integrally joined to the forward end of piston portion 64a.

A bearing assembly 66 is suitably mounted on the front face at bearing carrier flange portion 64c and an annular dust shield 68 is slidably positioned on the outer annular wall 62f of housing 62 and includes a plurality of finger portions 68a at is forward end for snapping engagement of the outer housing of bearing 66.

A coil spring 70 is positioned between bearing carrier hub portion 64b and annular inner piston wall 62d of the actuator housing with the rear end of the spring positioned in bore 62e and the front end of the spring bearing against radial flange portion 64c so as to constantly preload the bearing 66. As with the embodiment of FIGS. 1 and 2, annular bore 62e is sufficiently wide to allow the rear end of carrier hub portion 64b to move nestingly into bore 62e, concentrically within spring 70, during the operation of the actuator to minimize the axial dimension of the actuator, and spring 70 occupies a protected location between the bearing carrier hub portion and the inner wall of the piston bore where it acts effectively to constantly preload the bearing. The actuator of FIG. 4 is seen in a position intermediate the clutch engaged and clutch disengaged positions. In the clutch disengaged position, the rear end of bearing carrier hub portion 64b is moved forwardly out of bore 62e and in the clutch engaged position of the actuator the rear end of the hub portion of the bearing carrier is moved essentially to the closed end of bore 63e so as to maximize the overall axial compactness of the actuator.

Figure 5:
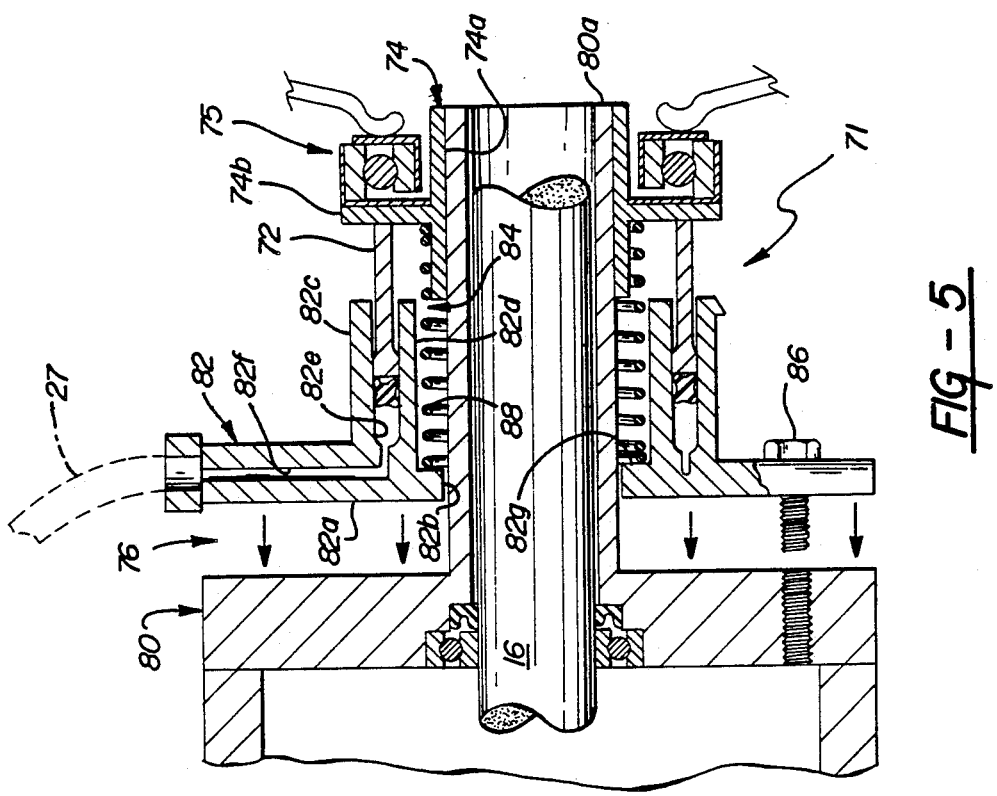
FIG. 5 is a view of a further modified form of the invention hydraulic actuator.

The modified actuator 71 seen in FIG. 5 is generally similar to the actuator seen in FIG. 4 with the exception that the annular piston 72 is formed separately from the bearing carrier 74, bearing carrier 74 includes a hub portion 74a and a flange portion 74b mounting the release bearing 75 on its forward face, and the actuator housing 76 comprises a two-part structure including a first part 80 formed integrally with the front plate of the transmission housing and a separate housing part 82. Housing part 80 defines the central quill shaft section 80a as an integral forwardly extending central portion of the front plate of the transmission and housing part 82 defines a rearward mounting section 82a defining a central aperture 82b for sliding passage of quill shaft section 80a, inner and outer annular walls 82c and 82d defining piston bore 82e therebetween, and a radial passage 82f in mounting section 82a providing fluid communication from conduit 27 to piston bore 82e. The internal undercut bore 84 for sliding receipt of the rearward end of the hub portion 74a of the bearing carrier is formed in this embodiment between the inner periphery of inner piston wall 82d and the outer periphery of quill shaft section 80a. Undercut bore 84 is open at its forward end and closed at its rearward end by the annular wall portion 82g of mounting section 82a disposed radially inwardly of inner piston wall section 82d. One or more bolts 86 pass through apertures in mounting section 82a to secure housing part 82 to housing part 80 with the bolts threadably engaging suitable threaded bores in housing part 80 to firmly position the rear face of housing part 82 against the front face of housing part 80 and form a rigid composite housing structure. As with the other embodiments, the undercut bore 84 provided between the quill shaft and the inner annular wall of the piston bore allows the annular piston and the bearing carrier hub portion to axially overlap and provides a convenient and operationally effective location for the preload coil spring 88.

The invention will be seen to provide a hydraulic actuator for use in engaging and disengaging the clutch of a motor vehicle in which the axial dimension of the actuator has been minimized without in any way sacrificing the effectiveness and the performance of the actuator.

Whereas preferred embodiments of the invention have been illustrated and described in detail it will be apparent that various changes may be made in the disclosed embodiments without departing from the scope or spirit of the invention.

We claim:

1. A hydraulic actuator for use with a clutch housing and a transmission input shaft mounted for rotation within the clutch housing, said actuator including:
   (A) a housing structure adapted to be positioned within the clutch housing concentrically around the transmission input shaft and defining a rearward mounting section, an annular quill shaft extending forwardly with respect to said rearward mounting section in concentrically surrounding relation to the input shaft, and annular inner and outer piston wall sections extending forwardly with respect to said mounting section and defining an annular piston bore between the inner annular surface of said outer piston wall section and the outer annular surface of said inner piston wall section having an open forward end, said inner piston wall section having an inner annular surface having a diameter greater than the diameter of the outer annular surface of said quill shaft by a predetermined radial distance;
   (B) an annular piston having its rear end positioned in said piston bore and extending at its forward end out of said piston bore; and
   (C) a bearing assembly including a bearing carrier slidably mounted on said quill shaft, said bearing carrier having a radial thickness at its rear end less than said predetermined radial distance so that said carrier may assume an axially overlapping relation to said annular piston.

2. A hydraulic actuator according to claim 1 wherein:
   (D) said housing is rearwardly undercut between said quill shaft and said inner piston wall section to define an annular bore for sliding receipt of the rearward end of said bearing carrier.

3. A hydraulic actuator according to claim 1 wherein:
   (D) said bearing assembly includes an annular flange portion extending radially outwardly from said carrier in forwardly spaced relation to the rear end of said carrier; and
   (E) the forward end of said piston is drivingly related to said annular portion.

4. The hydraulic actuator according to claim 3 wherein:
   (F) said flange portion, said carrier, and said annular piston are formed as a single integral piece.

5. A hydraulic actuator according to claim 3 wherein:
   (F) said piston is separate from said carrier and bears at its forward end against said flange portion.

6. A hydraulic actuator for use with a clutch housing and a transmission input shaft mounted for rotation within the clutch housing, said actuator including:
   (A) a housing structure adapted to be positioned within the clutch housing concentrically around the transmission input shaft and defining a rearward mounting section, a quill shaft extending forwardly with respect to said rearward mounting section in concentrically surrounding relation to the input shaft, and annular inner and outer piston wall sections extending forwardly with respect to said mounting section and defining an annular piston bore therebetween having an open forward end, said inner piston wall section having an inner diameter greater than the outer diameter of said quill shaft by a predetermined radial distance;
   (B) an annular piston having its rear end positioned in said piston bore and extending at its forward end out of said piston bore; and
   (C) a bearing assembly including a bearing carrier slidably mounted on said quill shaft, said bearing carrier having a radial thickness less than said predetermined radial distance so that said carrier may assume an axially overlapping relation to said annular piston;
   (D) said bearing assembly including an annular flange portion extending radially outwardly from said carrier in forwardly spaced relation to the rear end of said carrier;
   (E) the forward end of said piston being drivingly related to said annular flange portion; and
   (F) said actuator further including a coil spring surrounding said quill shaft and positioned radially between said annular piston and said carrier.

7. A hydraulic actuator according to claim 6 wherein:
   (G) said housing is rearwardly undercut between said quill shaft and said inner piston wall section to define an annular bore for sliding receipt of the rear end of said carrier and for receipt of the rear end of said coil spring.

8. A hydraulic actuator for use with a clutch and transmission assembly of the type including a transmission, a transmission housing, an input shaft for connection to the transmission and having an axis of rotation, and a clutch release element which is displaceable along said axis, said actuator comprising:
   (A) an actuator housing structure defining,
      (1) a rearward mounting section for attachment to the transmission housing,
      (2) a central annular quill shaft section extending forwarding with respect to said mounting section and defining an inner bore extending centrally through said housing structure and sized to loosely pass the input shaft;
      (3) an annular inner piston wall section extending forwardly from said mounting section in concentric radially outwardly spaced relation to said quill shaft section to define an annular intermediate bore therebetween closed at its rearward end by said housing structure and open at its forward end, and
      (4) an annular outer piston wall section extending forwardly from said mounting section in concentric radially outwardly spaced relation to said inner piston wall section to define an annular outer bore therebetween closed at its rearward end by said mounting section and open at its forward end; and
   (B) an annular piston having its rear end received in the open forward end of said outer annular bore and projecting forwardly out of said outer annular bore.

9. The hydraulic actuator according to claim 8 wherein:
(C) said quill shaft includes a forward portion disposed forwardly of the forward end of said outer bore;
(D) said actuator further includes a bearing assembly including an annular bearing carrier slidably mounted on said quill shaft forward portion and a release bearing carried by said bearing carrier; and
(E) the forward end of said piston is drivingly related to said bearing carrier.

10. A hydraulic actuator according to claim 9 wherein:
(F) said actuator further includes a coil spring surrounding said quill shaft, positioned at its rearward end in said annular intermediate bore, and bearing at its forward end against said bearing carrier.

11. A hydraulic actuator according to claim 10 wherein:
(G) said piston and said bearing carrier are formed as a single integral member.

12. A hydraulic actuator according to claim 10 wherein:
(G) said piston and said bearing carrier are separate members and said piston pushes at its front end against a rear face of said bearing carrier.

13. A hydraulic actuator for use with a clutch having a clutch housing and a transmission input shaft mounted for rotation within the clutch housing, said actuator including:
(A) a housing structure adapted to be positioned within said clutch housing concentrically around said input shaft and including a quill shaft section concentrically surrounding said input shaft and a piston section defining an annular piston bore spaced radially outwardly from said quill shaft;
(B) an annular piston having its rear end received in said piston bore and projecting forwardly out of the forward end of said piston bore to define an annular space between said piston and said quill shaft;
(C) a release bearing assembly slidably mounted on said quill shaft section forwardly of said piston bore; and
(D) a coil preload spring positioned in said annular space and bearing at its opposite ends respectively against said housing structure and said release bearing assembly.

14. A hydraulic actuator according to claim 13 wherein:
(E) said piston bore is defined at its inner periphery by an annular wall spaced radially outwardly from the outer surface of said quill shaft to define an annular spring bore and the rear end of said spring is received in said spring bore.

* * * * *